US012444823B2

(12) United States Patent
Maruyama et al.

(10) Patent No.: US 12,444,823 B2
(45) Date of Patent: Oct. 14, 2025

(54) WAVEGUIDE-MICROSTRIP LINE CONVERTER HAVING A CONVERSION SECTION WITH A HOLE THEREIN

(71) Applicant: Mitsubishi Electric Corporation, Tokyo (JP)

(72) Inventors: Takashi Maruyama, Tokyo (JP); Shigeo Udagawa, Tokyo (JP); Mitsuru Kirita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 277 days.

(21) Appl. No.: 18/026,132

(22) PCT Filed: Oct. 1, 2020

(86) PCT No.: PCT/JP2020/037431
§ 371 (c)(1),
(2) Date: Mar. 14, 2023

(87) PCT Pub. No.: WO2022/070385
PCT Pub. Date: Apr. 7, 2022

(65) Prior Publication Data
US 2023/0361446 A1 Nov. 9, 2023

(51) Int. Cl.
*H01P 5/107* (2006.01)

(52) U.S. Cl.
CPC .................................... *H01P 5/107* (2013.01)

(58) Field of Classification Search
CPC ........................................................ H01P 5/107
(Continued)

(56) References Cited

U.S. PATENT DOCUMENTS 8,723,616 B2 * 5/2014 Hirota et al. ............ H01P 5/107 333/125
9,564,671 B2 * 2/2017 Carmon et al. .......... H01P 5/107
(Continued)

FOREIGN PATENT DOCUMENTS

CN 110233320 A 9/2019
DE 112017006415 T5 9/2019
(Continued)

OTHER PUBLICATIONS

International Search Report and Written Opinion mailed on Dec. 15, 2020, received for PCT Application PCT/JP2020/037431, filed on Oct. 1, 2020, 8 pages including English Translation.
(Continued)

*Primary Examiner* — Benny T Lee
(74) *Attorney, Agent, or Firm* — XSENSUS LLP

(57) ABSTRACT

A waveguide-microstrip line converter includes a waveguide having an open end, a dielectric substrate having a first surface facing the open end and a second surface facing the opposite direction to the first surface, a ground conductor provided on the first surface and connected to the open end, the ground conductor being provided with a slot in a region enclosed by the end face of the open end, and a line conductor provided on the second surface. The line conductor includes a conversion section that performs power conversion between the line conductor and the waveguide, a microstrip line-provided at a distance from the conversion section in a first direction, and an impedance transformer provided between the conversion section and the microstrip line, for performing impedance matching between the conversion section and the microstrip line. A hole is formed in the conversion section.

14 Claims, 12 Drawing Sheets

(58) Field of Classification Search
USPC .......................................................... 333/26
See application file for complete search history.

(56) References Cited

U.S. PATENT DOCUMENTS

| | | | | |
|---|---|---|---|---|
| 10,811,753 | B2 * | 10/2020 | Nakajima et al. ...... | H01P 3/121 |
| 11,316,273 | B2 | 4/2022 | Maruyama et al. | |
| 11,469,511 | B2 | 10/2022 | Maruyama et al. | |
| 11,539,107 | B2 * | 12/2022 | Lim et al. ............... | H01P 3/121 |
| 2009/0256777 | A1 | 10/2009 | Nagai | |
| 2012/0176285 | A1 * | 7/2012 | Morgia .................. | H01P 5/107<br>343/772 |

FOREIGN PATENT DOCUMENTS

| | | | |
|---|---|---|---|
| DE | 112018006410 | T5 | 9/2020 |
| WO | 2019/138468 | A1 | 7/2019 |

OTHER PUBLICATIONS

Office Action mailed on May 22, 2025 for corresponding German Patent Application No. 112020007647.4.

* cited by examiner

WAVEGUIDE-MICROSTRIP LINE CONVERTER HAVING A CONVERSION SECTION WITH A HOLE THEREIN

CROSS-REFERENCE TO RELATED APPLICATION

The present application is based on PCT filing PCT/JP2020/037431, filed Oct. 1, 2020, the entire contents of which are incorporated herein by reference.

FIELD

The present disclosure relates to a waveguide-microstrip line converter capable of converting power propagating through a waveguide and power propagating through a microstrip line into each other.

BACKGROUND

Waveguide-microstrip line converters have been known which can convert power propagating through a waveguide and power propagating through a microstrip line into each other. Waveguide-microstrip line converters are widely used in antenna devices that transmit high-frequency signals in a microwave band or a millimeter-wave band.

Patent Literature 1 discloses a waveguide-microstrip line converter in which a ground conductor is provided on one surface of a dielectric substrate, and a line conductor is provided on a surface of the dielectric substrate facing the opposite direction to the surface on which the ground conductor is provided. An open end of a waveguide is connected to the ground conductor. A slot is provided in a region of the ground conductor enclosed by the end face of the open end. The line conductor includes a conversion section that performs power conversion between the line conductor and the waveguide, microstrip lines spaced apart from the conversion section, and impedance transformers that are provided between the conversion section and the microstrip lines to perform impedance matching between the conversion section and the microstrip lines.

CITATION LIST

Patent Literature

Patent Literature 1: WO 2019/138468 A

SUMMARY

Technical Problem

In the waveguide-microstrip line converter disclosed in Patent Literature 1, the wider the line width of the conversion section is made, the more unnecessary electromagnetic radiation from the slot can be reduced. On the other hand, the wider the line width of the conversion section is made, the larger the difference between the line width of the conversion section and the line width of the microstrip lines, and the larger the difference between the characteristic impedance of the conversion section and the characteristic impedance of the microstrip lines. As a result, the impedance transformers need to perform matching for sharp impedance changes, thus causing a problem of a narrowed usable frequency band of high-frequency signals.

The present disclosure has been made in view of the above, and an object thereof is to provide a waveguide-microstrip line converter capable of achieving both the reduction of unnecessary electromagnetic radiation from a slot and the widening of the band of the waveguide-microstrip line converter.

Solution to Problem

In order to solve the above-described problem and achieve the object, a waveguide-microstrip line converter according to the present disclosure includes: a waveguide having an open end; a dielectric substrate having a first surface facing the open end and a second surface facing the opposite direction to the first surface; a ground conductor provided on the first surface and connected to the open end, the ground conductor being provided with a slot in a region enclosed by the end face of the open end; and a line conductor provided on the second surface. The line conductor includes: a conversion section that performs power conversion between the line conductor and the waveguide; a microstrip line provided at a distance from the conversion section in a first direction; and an impedance transformer provided between the conversion section and the microstrip line, for performing impedance matching between the conversion section and the microstrip line. A hole is formed in the conversion section.

Advantageous Effects of Invention

The waveguide-microstrip line converter according to the present disclosure has the effect of being able to achieve both: the reduction of unnecessary electromagnetic radiation from the slot; and the widening of the band of the waveguide-microstrip line converter.

DESCRIPTION OF EMBODIMENTS

Hereinafter, a waveguide-microstrip line converter according to embodiments will be described in detail with reference to the drawings.

First Embodiment

Figure 1:
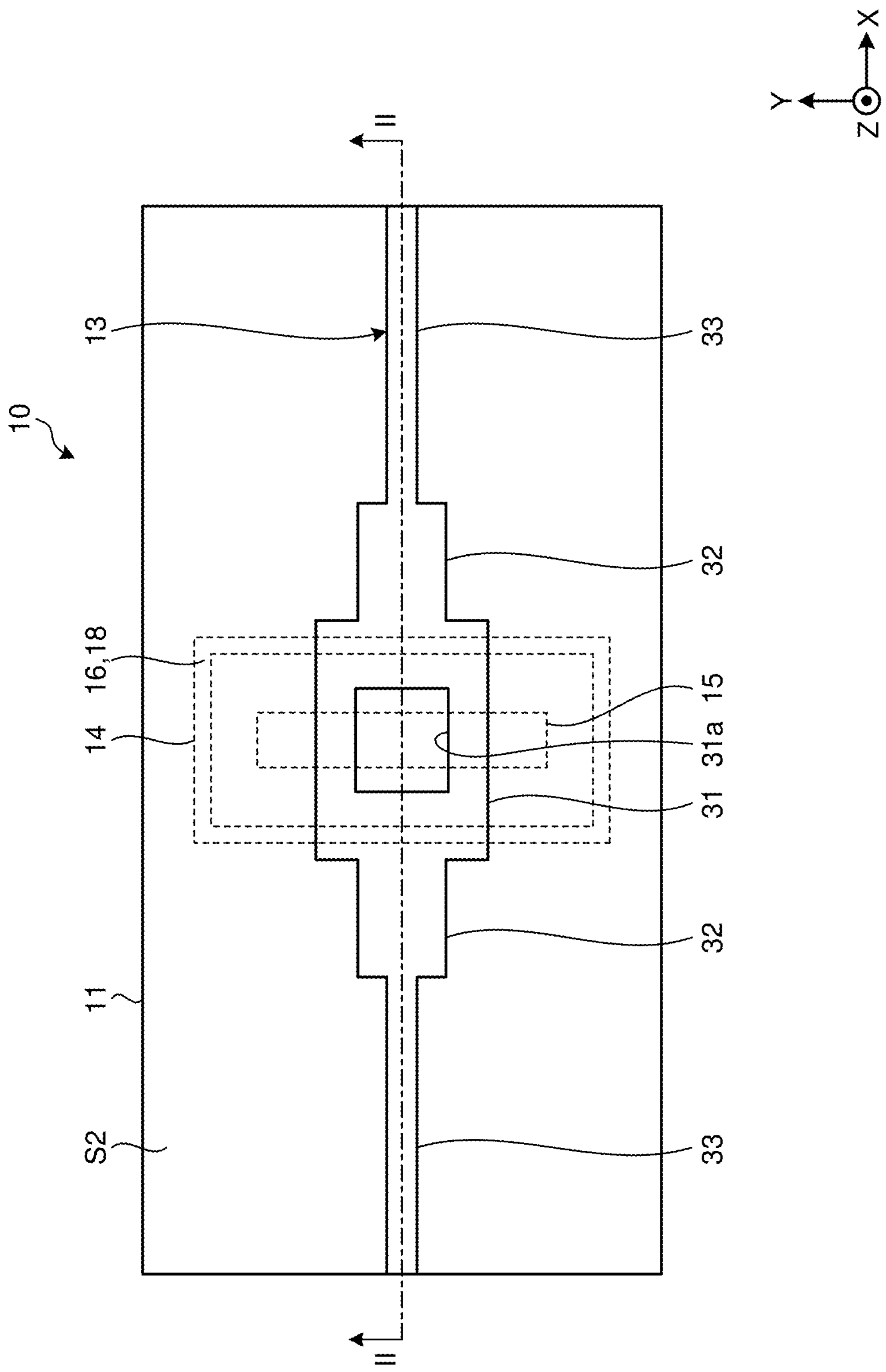
FIG. 1 is a plan view illustrating an external configuration of a waveguide-microstrip line converter according to a first embodiment.
Figure 2:
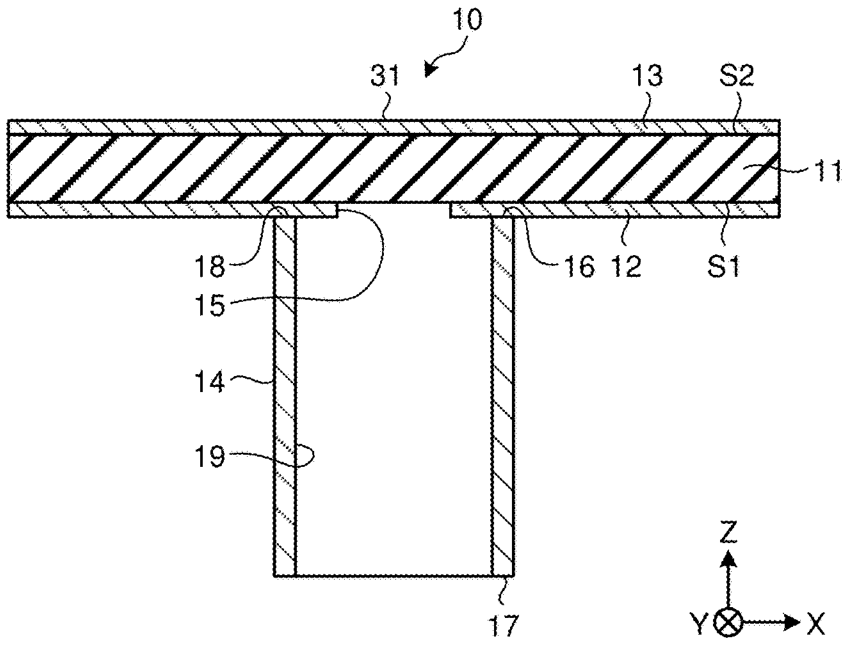
FIG. 2 is a cross-sectional view taken along line II-II illustrated in FIG. 1.

FIG. 1 is a plan view illustrating an external configuration of a waveguide-microstrip line converter 10 according to a first embodiment. FIG. 1 illustrates, by broken lines, elements of the waveguide-microstrip line converter 10 provided on the back side of the sheet surface behind elements indicated by solid lines. FIG. 2 is a cross-sectional view taken along line II-II illustrated in FIG. 1. The X axis, the Y axis, and the Z axis illustrated in each drawing are three axes perpendicular to each other. A direction parallel to the X axis is referred to as an X-axis direction that is a first direction; a direction parallel to the Y axis is referred to as a Y-axis direction that is a second direction; and a direction parallel to the Z axis is referred to as a Z-axis direction that is a third direction.

The waveguide-microstrip line converter 10 includes: a waveguide 14; a dielectric substrate 11; a ground conductor 12; and a line conductor 13 including microstrip lines 33. The waveguide-microstrip line converter 10 can convert power propagating through the waveguide 14 and power propagating through the microstrip lines 33 into each other. The waveguide 14 and the microstrip lines 33 are transmission paths that convey high-frequency signals.

Figure 3:
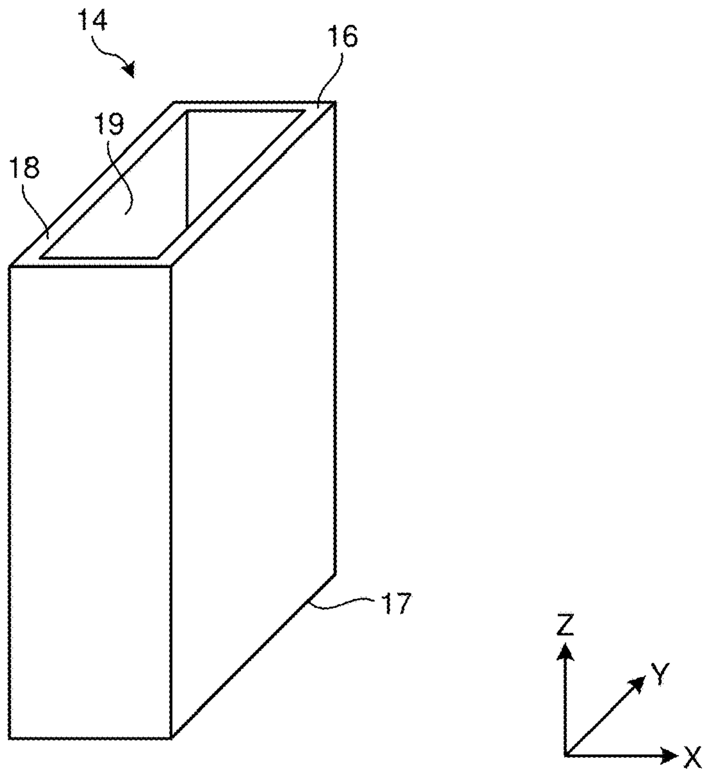
FIG. 3 is a perspective view illustrating an external configuration of a waveguide in the first embodiment.

FIG. 3 is a perspective view illustrating an external configuration of the waveguide 14 in the first embodiment. The waveguide 14 is a metal tube having a quadrangular tubular shape. The X-Y cross-sectional shape of the waveguide 14 is a rectangle having long sides parallel to the Y-axis direction and short sides parallel to the X-axis direction. In the waveguide 14, an electromagnetic wave propagates through an internal space enclosed by metal tube walls 19. The tube-axis direction of the waveguide 14 is parallel to the Z-axis direction. The tube axis is the center line of the waveguide 14. The waveguide 14 has an open end 16. The open end 16 is one end of the waveguide 14 in the tube-axis direction, and has an end face 18 of the same shape as the X-Y cross-sectional shape of the waveguide 14. The end face 18 acts as a short-circuit surface connected to the ground conductor 12 illustrated in FIG. 2. The other end of the waveguide 14 in the tube-axis direction acts as an input/output end 17 to which a high-frequency signal to be transmitted through the waveguide 14 is input or from which a high-frequency signal transmitted through the waveguide 14 is output. As illustrated in FIG. 2, the end face 18 and the ground conductor 12 are connected in direct contact in the first embodiment, but may be connected in a noncontact manner. For example, a choke structure may be provided between the end face 18 and the ground conductor 12 so that the end face 18 and the ground conductor 12 are connected to each other in a noncontact manner.

The configuration of the waveguide 14 may be changed as appropriate. For example, the waveguide 14 may include a dielectric substrate through which a large number of through holes are formed, instead of the metal tube with the tubular tube walls 19. Further, the waveguide 14 may be filled with a dielectric material in the internal space enclosed by the tube walls 19. Furthermore, the waveguide 14 may be, for example, a waveguide of a shape with corners in an X-Y cross section having a curvature, or a ridge waveguide.

As illustrated in FIG. 2, the dielectric substrate 11 is a flat-shaped member formed of a resin material. The dielectric substrate 11 has a first surface S1 facing the open end 16 and a second surface S2 facing the opposite direction to the first surface S1. The first surface S1 and the second surface S2 are both parallel to the X-axis direction and the Y-axis direction.

Figure 4:
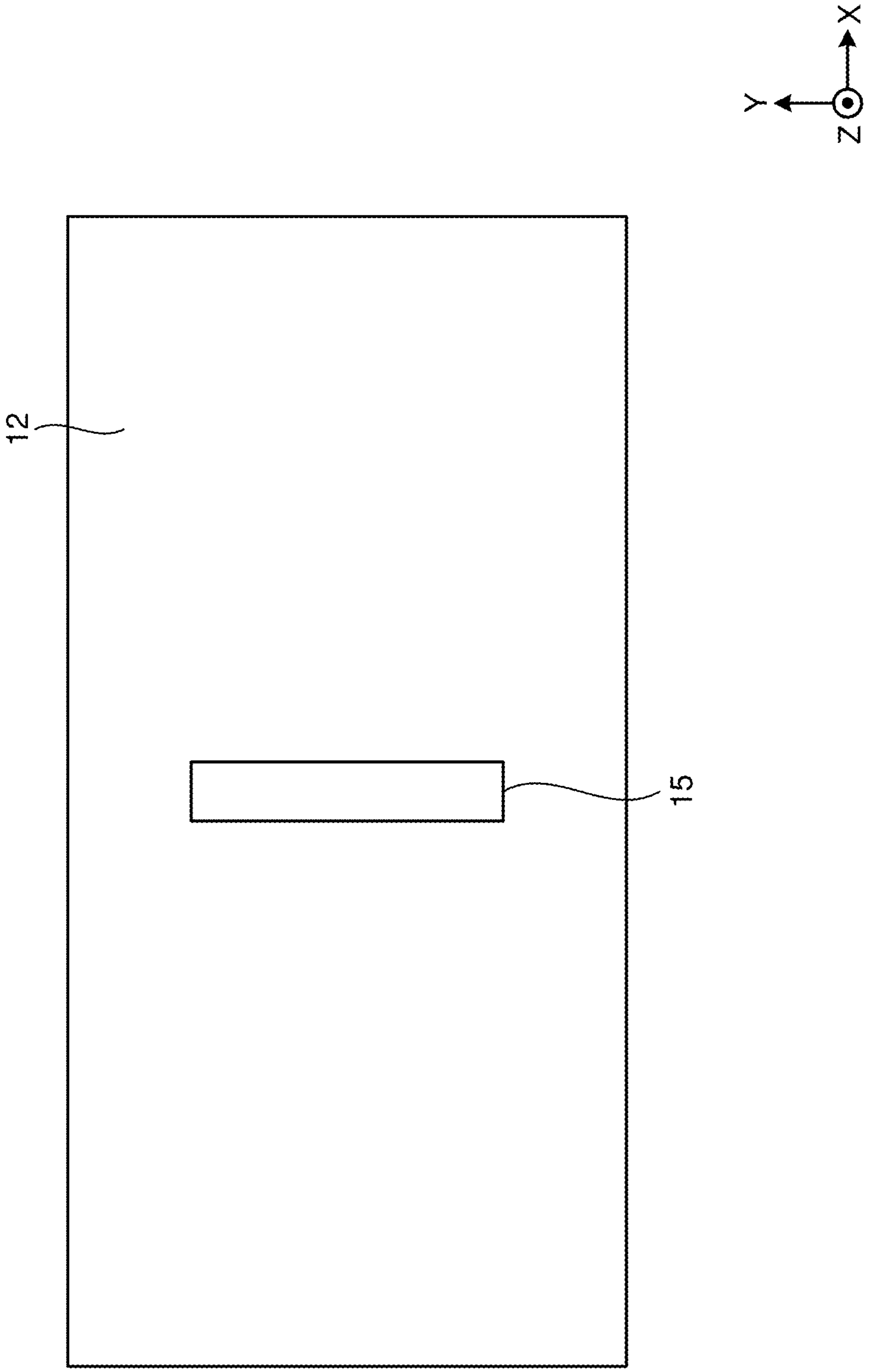
FIG. 4 is a plan view of a ground conductor in the first embodiment.

The ground conductor 12 is provided on the first surface S1 of the dielectric substrate 11. The ground conductor 12 is formed, for example, by attaching by pressure copper foil that is conductive metal foil to the first surface S1. The ground conductor 12 may be a metal plate that is formed in advance and then attached to the dielectric substrate 11. The open end 16 is connected to the ground conductor 12. A slot 15 is provided in a region of the ground conductor 12 enclosed by the end face 18 of the open end 16. The slot 15 is formed by removing the conductor within an X-Y region of the ground conductor 12 enclosed by the end face 18 of the open end 16. The slot 15 is an opening formed by removing a part of the ground conductor 12. The slot 15 is formed, for example, by patterning the copper foil attached by pressure to the first surface S1. FIG. 4 is a plan view of the ground conductor 12 in the first embodiment. The shape of the slot 15 is a rectangle having long sides parallel to the Y axis and short sides parallel to the X axis.

Figure 5:
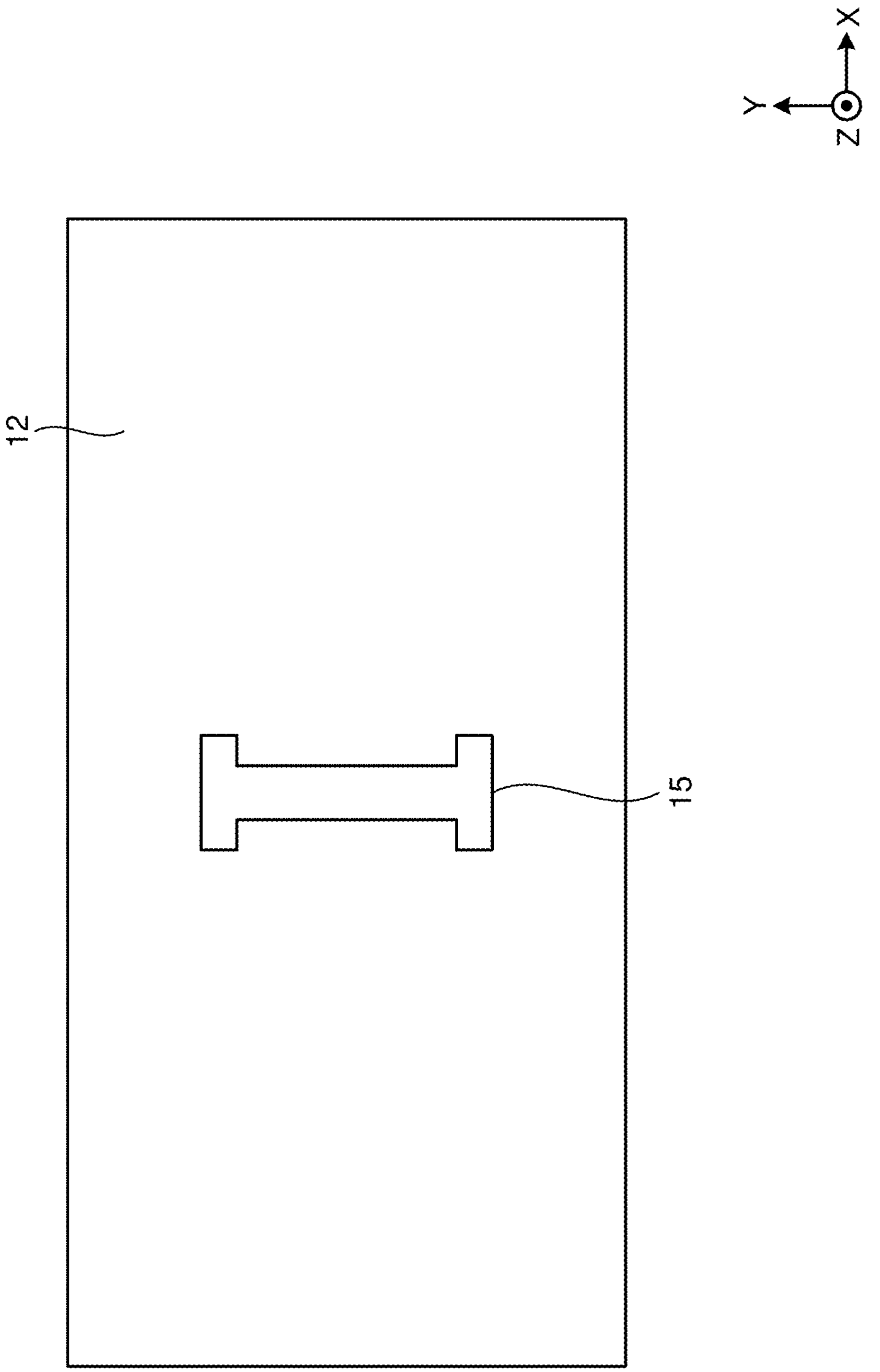
FIG. 5 is a plan view illustrating a modification of a slot.

The shape of the slot 15 is not particularly limited as long as it allows electromagnetic radiation. FIG. 5 is a plan view illustrating a modification of the slot 15. The shape of the slot 15 may be, for example, an I shape with the width in the X-axis direction of both ends in the Y-axis direction is wider than the width in the X-axis direction of the center portion in the Y-axis direction. This shape strengthens an electric field in the center portion of the slot 15, and strengthens electromagnetic coupling between the open end 16 of the waveguide 14 and the line conductor 13 illustrated in FIG. 2. Consequently, power can be efficiently converted between the waveguide 14 and the line conductor 13.

The line conductor 13 is provided on the second surface S2 of the dielectric substrate 11. The line conductor 13 on the second surface S2 of the dielectric substrate 11 is provided to pass directly above the open end 16 of the waveguide 14. The line conductor 13 is formed, for example, by patterning copper foil attached by pressure to the second surface S2. The line conductor 13 may be a metal plate that is formed in advance and then attached to the dielectric substrate 11.

Figure 6:
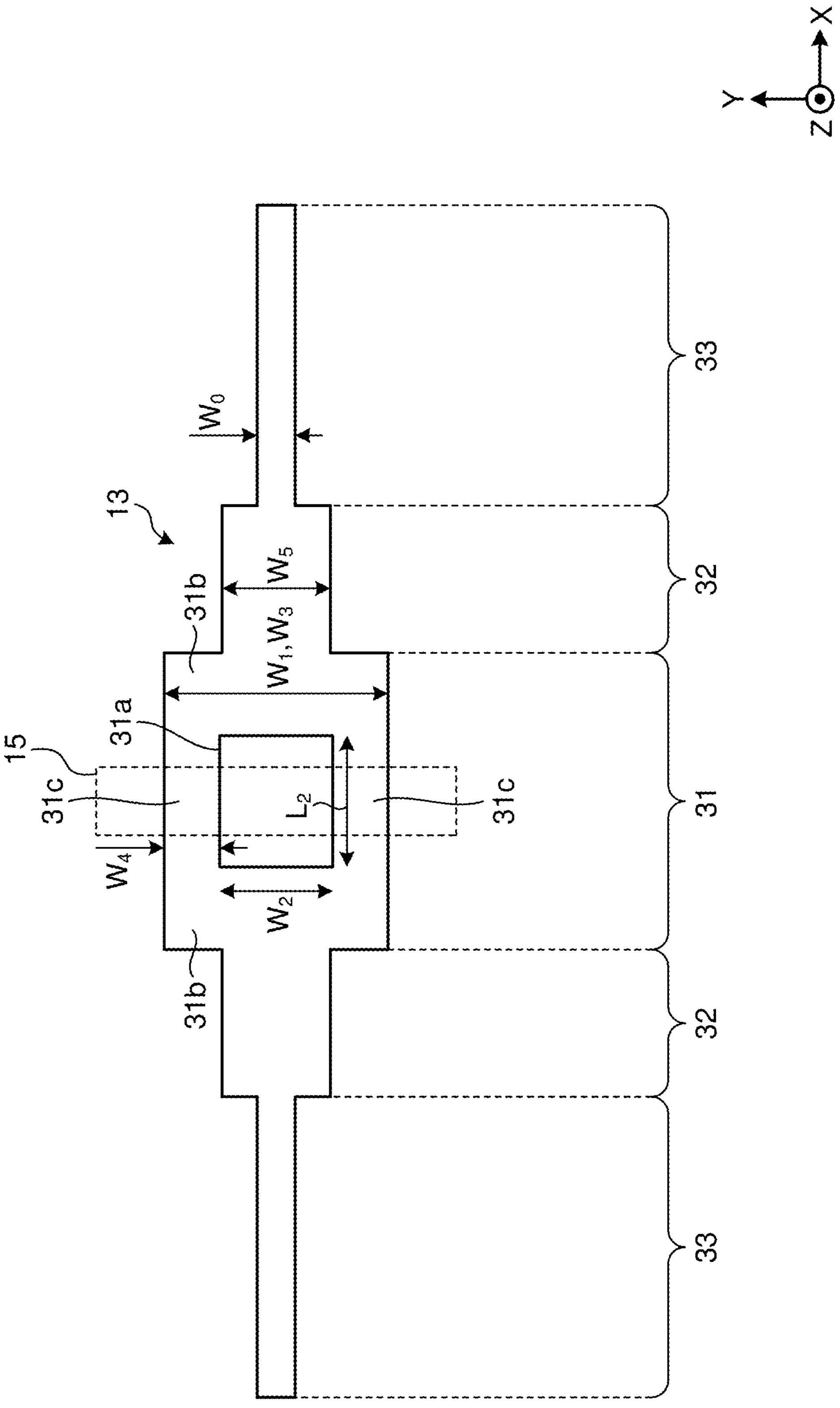
FIG. 6 is a plan view of a line conductor in the first embodiment.

FIG. 6 is a plan view of the line conductor 13 in the first embodiment. In FIG. 6, the slot 15 is illustrated by broken lines for reference. The line conductor 13 includes: a conversion section 31 that performs power conversion between the line conductor 13 and the waveguide 14; the microstrip lines 33 provided at a distance in the X-axis direction from the conversion section 31 illustrated in FIG. 6; and impedance transformers 32 that are provided between the conversion section 31 and the microstrip lines 33 to perform impedance matching between the conversion section 31 and the microstrip lines 33. The conversion section 31 is located opposite the slot 15 across the dielectric substrate 11 illustrated in FIG. 2. The conversion section 31 is provided in a position overlapping the slot 15 in the tube-axis direction of the waveguide 14. In the first embodiment, the conversion section 31 is located immediately above the slot 15. Hereinafter, a line length means the length of a transmission path along the propagation direction of an electromagnetic wave, and a line width means the width of a transmission path along a direction perpendicular to the line length.

The conversion section 31, the impedance transformers 32, and the microstrip lines 33 illustrated in FIG. 6 are integrally formed by one metal member, which is formed of metal foil or a metal sheet. The conversion section 31 and the adjacent impedance transformers 32 are formed to have different line widths. The impedance transformers 32 and the adjacent microstrip lines 33 are formed to have different line widths from each other.

The number of the microstrip lines 33 provided is two in total, one on each side of the conversion section 31 in the X-axis direction. The microstrip lines 33 are quadrilateral portions having a constant line width $W_0$ in the X-axis direction. The microstrip lines 33 are located in end portions of the line conductor 13 in the X-axis direction. The line length of the microstrip lines 33 is not limited to the illustrated example, and may be appropriately changed.

The conversion section 31 is a quadrilateral portion having a constant line width $W_1$ in the X-axis direction. The conversion section 31 is located in the center of the line conductor 13 in the X-axis direction. The line width $W_1$ of the conversion section 31 is wider than the line width $W_0$ of the microstrip lines 33. That is, the relationship $W_1>W_0$ holds. The line length of the conversion section 31 is a length corresponding to $\lambda/2$, where $\lambda$ is the wavelength of a high-frequency signal transmitted through the line conductor 13.

A hole 31*a* is formed in the conversion section 31. The position of the hole 31*a* is not particularly limited, but is the center of the conversion section 31 in the first embodiment. The shape of the hole 31*a* is not particularly limited, but is a quadrilateral in the first embodiment. The conversion section 31 and the hole 31*a* are formed such that the relationships $L_2<\lambda/2$ and $W_2<W_1$ hold, where $L_2$ is the length of the hole 31*a* in the X-axis direction, and $W_2$ is the length in the Y-axis direction. The conversion section 31 is provided with two wide portions 31*b* and two narrow portions 31*c* around the hole 31*a*. One wide portion 31*b* is provided on each side of the hole 31*a* in the X-axis direction, extending in the Y-axis direction. One narrow portion 31*c* is provided on each side of the hole 31*a* in the Y-axis direction, extending in the X-axis direction. The wide portions 31*b* are quadrilateral portions having a constant line width $W_3$ in the X-axis direction. The line width $W_3$ is equal to the line width $W_1$. That is, the relationship $W_3=W_1$ holds. The narrow portions 31*c* are quadrilateral portions having a constant line width $W_4$ in the X-axis direction. The line width $W_4$ is narrower than the line width $W_1$. In the first embodiment, the conversion section 31 and the hole 31*a* are formed such that the relationship $W_4=(W_1-W_2)/2$ holds.

The impedance transformers 32 are quadrilateral portions having a constant line width $W_5$ in the X-axis direction. One impedance transformer 32 is provided on each side of the conversion section 31 in the X-axis direction. The line width $W_5$ of the impedance transformers 32 is wider than the line width $W_0$ of the microstrip lines 33. That is, the relationship $W_1>W_0$ holds. The relationship between the line width $W_1$ of the conversion section 31 and the line width $W_5$ of the impedance transformers 32 is $W_1>W_5$ in FIG. 6, but is not particularly limited, and may be appropriately changed. The line length of the impedance transformers 32 is a length corresponding to $\lambda/4$.

Next, the operation of the waveguide-microstrip line converter 10 according to the first embodiment will be described with reference to FIGS. 2 and 6. Here, a case where a high-frequency signal is transmitted from the waveguide 14 to the microstrip lines 33 will be described as an example.

As illustrated in FIG. 2, an electromagnetic wave that has propagated inside the waveguide 14 reaches the ground conductor 12. The electromagnetic wave that has reached the ground conductor 12 propagates to the conversion section 31 through the slot 15. The propagation of the electromagnetic wave to the conversion section 31 includes generation of energy of the electromagnetic wave between the ground conductor 12 and the conversion section 31. As illustrated in FIG. 6, the electromagnetic wave that has propagated to the conversion section 31 propagates toward the two microstrip lines 33. The waveguide-microstrip line converter 10 outputs high-frequency signals transmitted from the two microstrip lines 33 in the X-axis direction. The high-frequency signals output from both sides have opposite phases.

Next, effects of the waveguide-microstrip line converter 10 according to the first present embodiment will be described.

The wider the line width $W_1$ of the conversion section 31 illustrated in FIG. 6 is made, the more unnecessary electromagnetic radiation from the slot 15 can be reduced. By adjusting the line width $W_1$ of the conversion section 31, unnecessary electromagnetic radiation from discontinuous portions between the conversion section 31 and the impedance transformers 32 can be adjusted. Consequently, unnecessary electromagnetic radiation in the entire waveguide-microstrip line converter 10 can be controlled. On the other hand, the conversion section 31, the impedance transformers 32, and the microstrip lines 33 have characteristic impedances corresponding to their respective line widths. The wider the line width $W_1$ of the conversion section 31 is made, the larger the difference between the line width $W_1$ of the conversion section 31 and the line width $W_0$ of the microstrip lines 33, that is, the difference between the characteristic impedance of the conversion section 31 and the characteristic impedance of the microstrip lines 33. This requires matching for sharp impedance changes at the impedance transformers 32, thus resulting in a narrowed usable frequency range of high-frequency signals. In the first embodiment, by forming the hole 31*a* in the conversion section 31, the wide portions 31*b* having the line width $W_3$ and the narrow portions 31*c* having the line width $W_4$ are formed in the conversion section 31. Here, in the conversion section 31, the characteristic impedance corresponding to the line width $W_4$ is referred to as $Z_4$. The two narrow portions 31*c* having the line width $W_4$ are present in parallel in regions of the conversion section 31 located immediately above the slot 15. Thus, the characteristic impedance of the conversion section 31 immediately above the slot 15 is $Z_4/2$. By contrast, if the conversion section 31 does not have the hole 31*a*, the characteristic impedance of the conversion section 31 immediately above the slot 15 is $Z_1$ corresponding to the line width $W_1$. Since the characteristic impedance $Z_4/2$ is smaller than the characteristic impedance $Z_1$, the relationship $Z_4/2<Z_1$ holds. Thus, even when the line width $W_1$ of the conversion section 31 is increased, the difference in characteristic impedance between the conversion section 31 and the microstrip lines 33 can be reduced by the narrow portions 31*c*. This eliminates the need for matching for sharp impedance changes at the impedance transformers 32, widening the usable frequency band of high-frequency signals. That is, the first embodiment can achieve both the reduction of unnecessary electromagnetic radiation from the slot 15 and the widening of the band of the waveguide-microstrip line converter 10. Since the size of the hole 31*a* is smaller than 2, the hole 31*a* has little effect on the reduction of unnecessary electromagnetic radiation from the slot 15.

The line width $W_1$ of the conversion section 31 illustrated in FIG. 6 is smaller than the long sides of the waveguide 14 and is smaller than the length of the slot 15 in the Y-axis direction. The conversion of power from the waveguide 14 to the conversion section 31 is not necessarily controlled by physical dimensions, and sufficient electromagnetic coupling between the waveguide 14 and the conversion section 31 allows efficient conversion.

In the microstrip lines 33 illustrated in FIG. 6, the characteristic impedance corresponding to the line width $W_0$ is referred to as $Z_0$. The difference in line width between the conversion section 31 and the microstrip lines 33 is relatively large. Thus, if the microstrip lines 33 directly adjoin the conversion section 31, power loss increases due to the mismatch between the characteristic impedance $Z_1$ of the conversion section 31 and the characteristic impedance $Z_0$ of the microstrip lines 33. In this regard, in the first embodiment, the impedance transformers 32 having a line width wider than that of the microstrip lines 33 and narrower than that of the conversion section 31 are provided between the conversion section 31 and the microstrip lines 33, so that impedance matching between the conversion section 31 and the microstrip lines 33 can be performed, and thus power loss can be reduced. Consequently, high electrical performance can be obtained without a through hole being provided in the dielectric substrate 11 illustrated in FIG. 2.

The first embodiment eliminates the need for a through hole in the dielectric substrate 11 illustrated in FIG. 2, and thus allows the simplification of a manufacturing process and the reduction of manufacturing costs by the omission of through hole processing. In addition, the first embodiment can avoid a situation where electrical performance is degraded by the breakage of a through hole, and thus can improve reliability and obtain stable electrical performance. When the waveguide-microstrip line converter 10 is used in a feed circuit of an antenna device (not illustrated), the antenna device can obtain stable transmission power and reception power.

There is a conventionally known configuration in which a fine gap is provided in a conductor of a portion corresponding to the conversion section 31 illustrated in FIG. 6 to divide a line, and a high-frequency signal is transmitted by electromagnetic coupling. If a defect occurs in the processing of the gap, an error can occur in the line length. By contrast, the line conductor 13 of the first embodiment is one metal member with portions from the conversion section 31 to the microstrip lines 33 continuously formed without divisions. The first embodiment eliminates the need to form a gap in the line conductor 13, and thus can avoid the problem of a gap processing defect, and can facilitate the processing of the line conductor 13.

In the waveguide-microstrip line converter 10 illustrated in FIG. 1, unnecessary electromagnetic radiation can occur from the slot 15 or from portions of the line conductor 13 where the line width is discontinuous. By adjusting the dimensions of the slot 15 and the portions of the line conductor 13, the amplitude and phase of a radiated electromagnetic wave can be adjusted. By adjusting the amplitude and phase of a radiated electromagnetic wave, unnecessary electromagnetic radiation in a specific direction such as toward the +side of the Z axis from the waveguide-microstrip line converter 10 may be reduced, or unnecessary electromagnetic radiation may be evenly diffused in all directions so that large power is not radiated in any direction. Even with this, the waveguide-microstrip line converter 10 can obtain high electrical performance.

The first embodiment has illustrated the case where a high-frequency signal is transmitted from the waveguide 14 to the microstrip lines 33, but high-frequency signals may be transmitted from the microstrip lines 33 to the waveguide 14. In this case, high-frequency signals having opposite phases are input to the two microstrip lines 33. Even with this, power loss in the waveguide-microstrip line converter 10 can be reduced. The shape of the hole 31*a* is a quadrilateral in the first embodiment, but may be a shape other than a quadrilateral such as a circle, a trapezoid, or a triangle. The center of the hole 31*a* coincides with the center of the conversion section 31 in the first embodiment, but may be shifted from the center of the conversion section 31 in at least one of the X-axis direction and the Y-axis direction. The conversion section 31 is located immediately above the slot 15 in the first embodiment, which is not intended to limit the positional relationship between the conversion section 31 and the slot 15. That is, the waveguide-microstrip line converter 10 can be arranged with the tube-axis direction of the waveguide 14 directed not only in the vertical direction but also in any direction. It is only required that the conversion section 31 and the slot 15 are in positions overlapping each other in the tube-axis direction of the waveguide 14.

Second Embodiment

Figure 7:
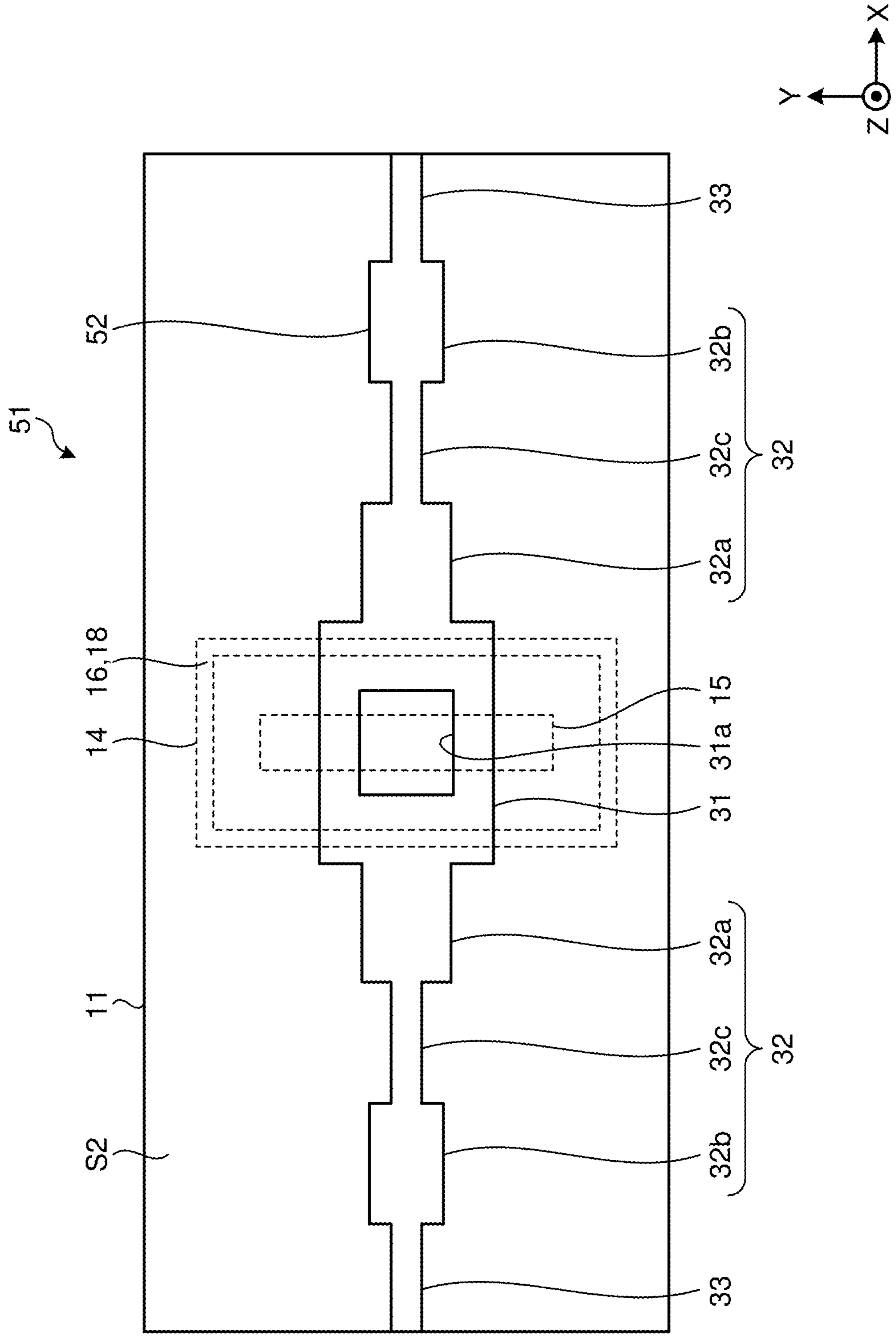
FIG. 7 is a plan view illustrating an external configuration of a waveguide-microstrip line converter according to a second embodiment.
Figure 8:
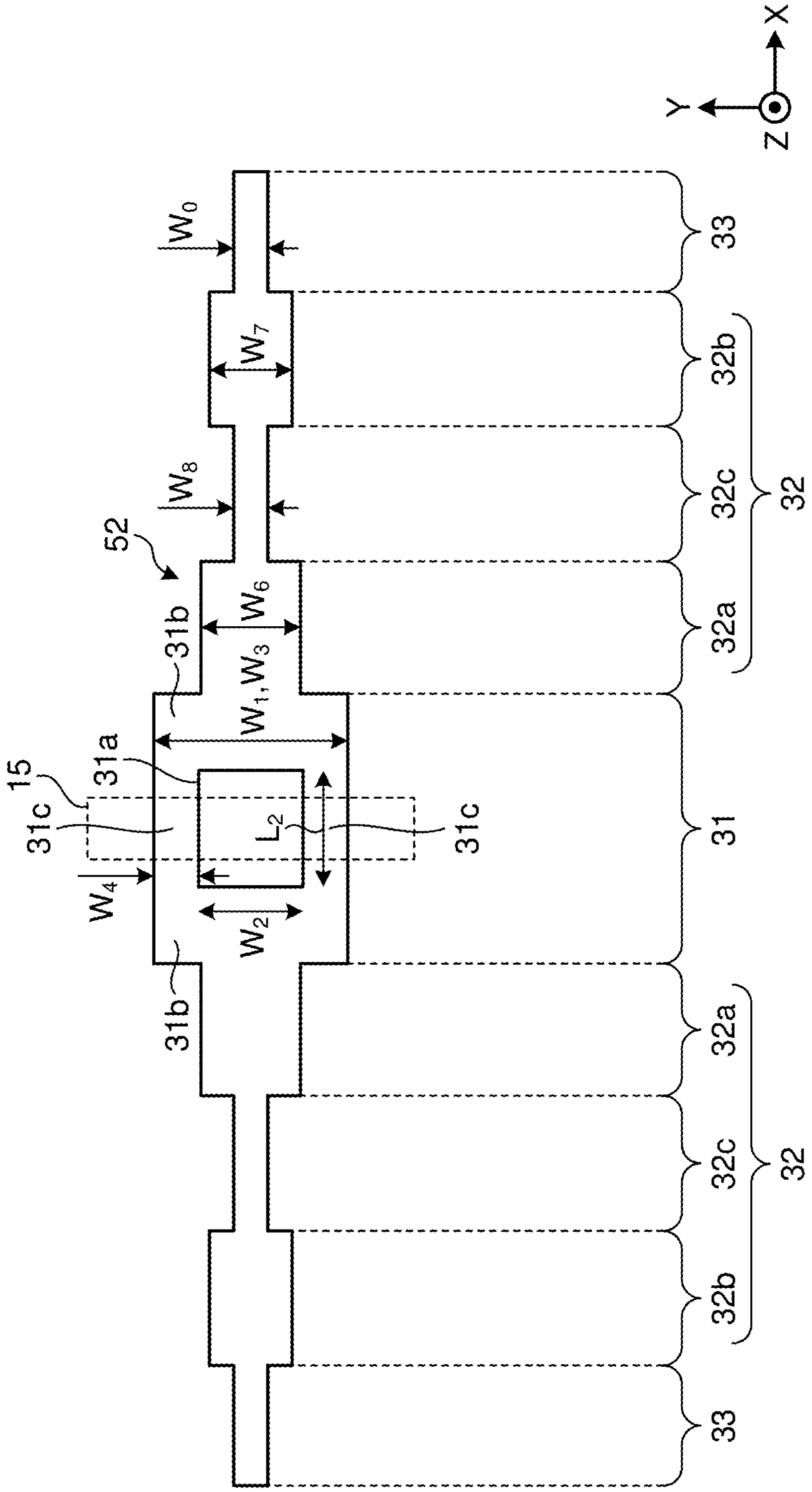
FIG. 8 is a plan view of a line conductor in the second embodiment.

FIG. 7 is a plan view illustrating an external configuration of a waveguide-microstrip line converter 51 according to a second embodiment. FIG. 8 is a plan view of a line conductor 52 in the second embodiment. In FIG. 8, the slot 15 is indicated by broken lines for reference. The same portions as those in the first embodiment described above are denoted by the same reference numerals without duplicate explanations. In the second embodiment, the line conductor 52 is provided instead of the line conductor 13 of the first embodiment.

As illustrated in FIG. 7, the line conductor 52 includes: the conversion section 31 that is located opposite the slot 15 across the dielectric substrate 11 to perform power conversion between the line conductor 52 and the waveguide 14; the microstrip lines 33 provided at a distance from the conversion section 31 in the X-axis direction; and the impedance transformers 32 that are provided between the conversion section 31 and the microstrip lines 33 to perform impedance matching between the conversion section 31 and the microstrip lines 33.

Each impedance transformer 32 includes: a first impedance transformation section 32*a*; a second impedance transformation section 32*b* provided at a distance from the first impedance transformation section 32*a* in the X-axis direction; and a third impedance transformation section 32*c* provided between the first impedance transformation section 32*a* and the second impedance transformation section 32*b* and having a line width smaller than both the line width of the first impedance transformation section 32*a* and the line width of the second impedance transformation section 32*b*.

The first impedance transformation section 32*a*, the third impedance transformation section 32*c*, and the second impedance transformation section 32*b* are arranged in this order from the conversion section 31 toward the microstrip line 33. As illustrated in FIG. 8, the first impedance transformation section 32*a* has a constant line width $W_6$ in the X-axis direction. The second impedance transformation section 32*b* has a constant line width $W_7$ in the X-axis direction. The third impedance transformation section 32*c* has a constant line width $W_8$ in the X-axis direction. The line width $W_8$ of the third impedance transformation section 32*c* is narrower than the line width $W_6$ of the first impedance transformation section 32*a*. That is, the relationship $W_8<W_6$ holds.

The second impedance transformation section 32*b* is located between the third impedance transformation section 32*c* and the microstrip line 33. The line width $W_7$ of the second impedance transformation section 32*b* is wider than both the line width $W_8$ of the third impedance transformation section 32*c* and the line width $W_0$ of the microstrip line 33. That is, the relationships $W_7>W_8$ and $W_7>W_0$ hold. The line lengths of the second impedance transformation section 32*b* and the third impedance transformation section 32*c* are each a length corresponding to $\lambda/4$.

The first impedance transformation section 32*a*, the second impedance transformation section 32*b*, and the third impedance transformation section 32*c* have characteristic impedances corresponding to their respective line widths. Here, the characteristic impedance of the first impedance transformation section 32*a* is referred to as $Z_6$ corresponding to the line width $W_6$. The characteristic impedance of the second impedance transformation section 32*b* is referred to as $Z_7$ corresponding to the line width $W_7$. The characteristic impedance of the third impedance transformation section 32*c* is referred to as $Z_8$ corresponding to the line width $W_8$. The characteristic impedance $Z_8$ is larger than the characteristic impedance $Z_6$. That is, the relationship $Z_8>Z_6$ holds. The characteristic impedance $Z_7$ is smaller than both the characteristic impedance $Z_8$ and the characteristic impedance $Z_0$. That is, the relationships $Z_7<Z_8$ and $Z_7<Z_0$ hold.

In the second embodiment, as illustrated in FIG. 7, the waveguide-microstrip line converter 51 is provided with the first impedance transformation sections 32*a* and the second impedance transformation sections 32*b* having a line width wider than that of the microstrip lines 33, so that impedance matching between the conversion section 31 and the microstrip lines 33 can be performed. Consequently, power loss can be reduced.

In the second embodiment, as illustrated in FIG. 8, the third impedance transformation sections 32*c* and the second impedance transformation sections 32*b* function to reduce an impedance mismatch due to the difference in line width between the first impedance transformation sections 32*a* and the microstrip lines 33. The line conductor 52 includes the first impedance transformation sections 32*a*, the second impedance transformation sections 32*b*, and the third impedance transformation sections 32*c*, which are portions with the line widths varied stepwise, so that sharp changes in impedance in the propagation of an electromagnetic wave can be mitigated. Consequently, power loss can be effectively reduced. Note that a high-frequency signal may be input from the waveguide 14 and output from each microstrip line 33, or may be input from each microstrip line 33 and output from the waveguide 14.

Third Embodiment

Figure 9:
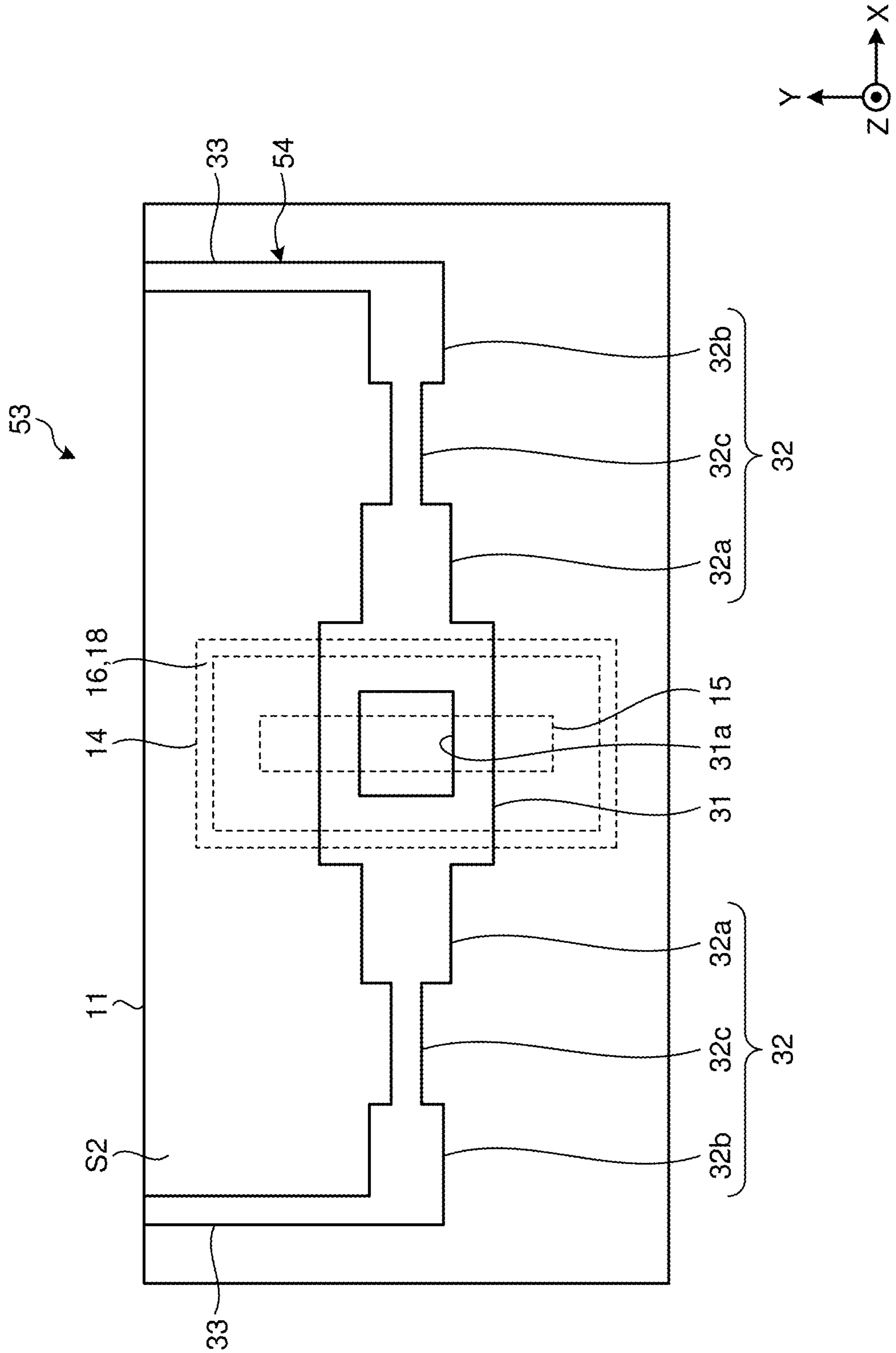
FIG. 9 is a plan view illustrating an external configuration of a waveguide-microstrip line converter according to a third embodiment.
Figure 10:
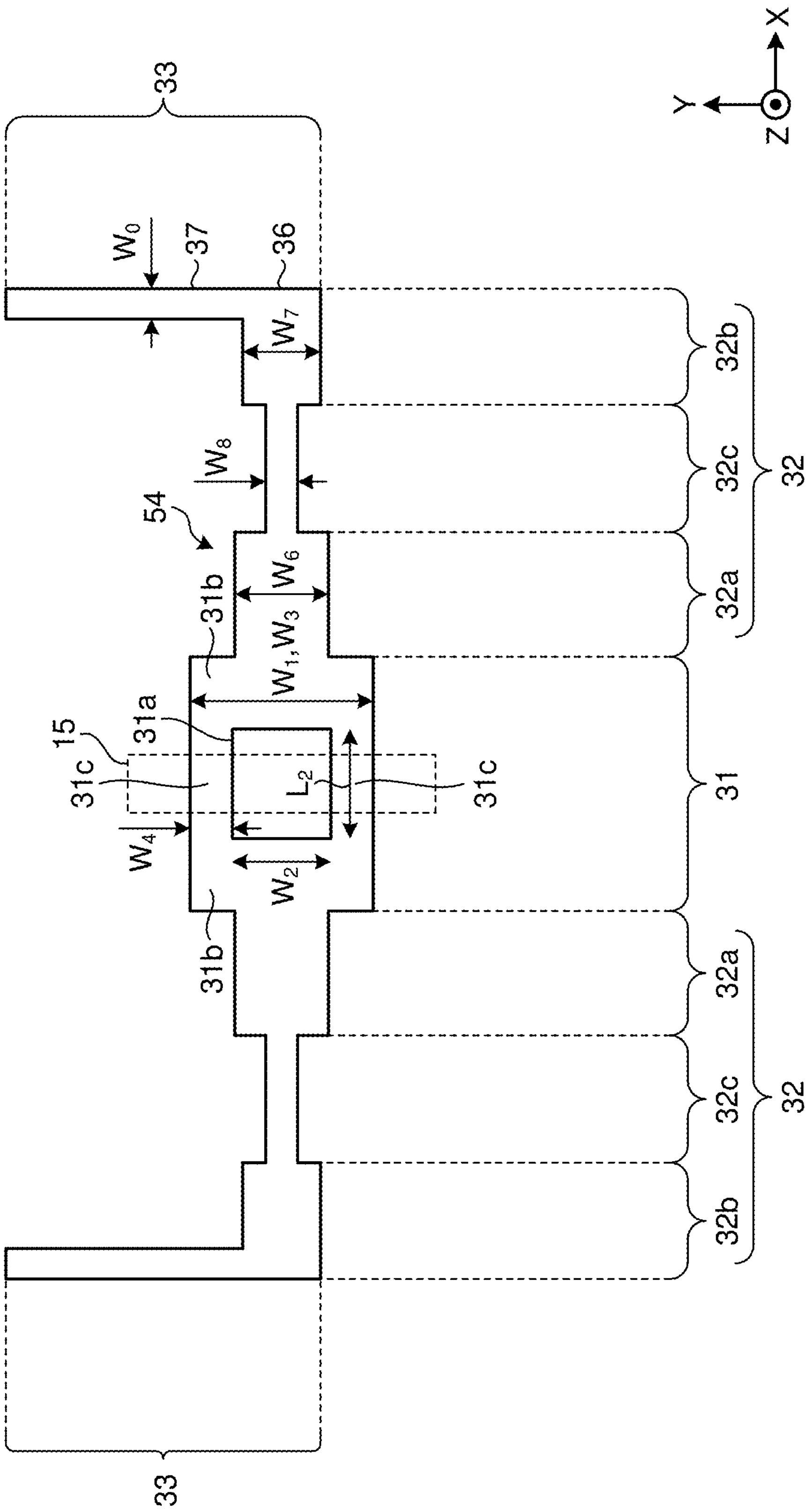
FIG. 10 is a plan view of a line conductor in the third embodiment.

FIG. 9 is a plan view illustrating an external configuration of a waveguide-microstrip line converter 53 according to a third embodiment. FIG. 10 is a plan view of a line conductor 54 in the third embodiment. In FIG. 10, the slot 15 is indicated by broken lines for reference. The same portions as those in the second embodiment described above are denoted by the same reference numerals without duplicate explanations. In the third embodiment, the line conductor 54 is provided instead of the line conductor 52 of the second embodiment. The third embodiment is different from the second embodiment in the extending direction of the microstrip lines 33.

In the present embodiment, as illustrated in FIG. 9, the microstrip lines 33 extend from the second impedance transformation sections 32*b* in the Y-axis direction perpendicular to the X-axis direction. That is, the extending direction of the microstrip lines 33 is parallel to the Y-axis direction. In the microstrip lines 33, high-frequency signals are propagated in the Y-axis direction. As illustrated in FIG. 10, the second impedance transformation sections 32*b* and the microstrip lines 33 are arranged such that an edge 36 of the second impedance transformation sections 32*b* intersected by the X-axis direction and an edge 37 of the microstrip lines 33 intersected by the X-axis direction form one straight line along the Y-axis direction. This configuration allows the microstrip lines 33 to be extended in the Y-axis direction while suppressing unnecessary electromagnetic radiation at bends between the second impedance transformation sections 32*b* and the microstrip lines 33.

Between the second impedance transformation sections 32*b* and the microstrip lines 33, a portion where the line width between the second impedance transformation sections 32*b* and the microstrip lines 33 is discontinuous and a bend in the transmission path are in one body. If the microstrip lines 33 of the constant line width include a bend between a portion extended in the X-axis direction and a portion extended in the Y-axis direction, unnecessary electromagnetic radiation can occur at two portions, the portion where the line width between the second impedance transformation sections 32*b* and the microstrip lines 33 is discontinuous and the bend in the microstrip lines 33. In the third embodiment, since the portion where the line width is discontinuous and the bend in the transmission path are formed in one body, unnecessary electromagnetic radiation can occur at one place. This allows the waveguide-microstrip line converter 53 that transmits high-frequency signals between portions extending in directions perpendicular to each other to reduce power loss due to unnecessary electromagnetic radiation. Note that a high-frequency signal may be input from the waveguide 14 and output from each microstrip line 33, or may be input from each microstrip line 33 and output from the waveguide 14.

Figure 11:
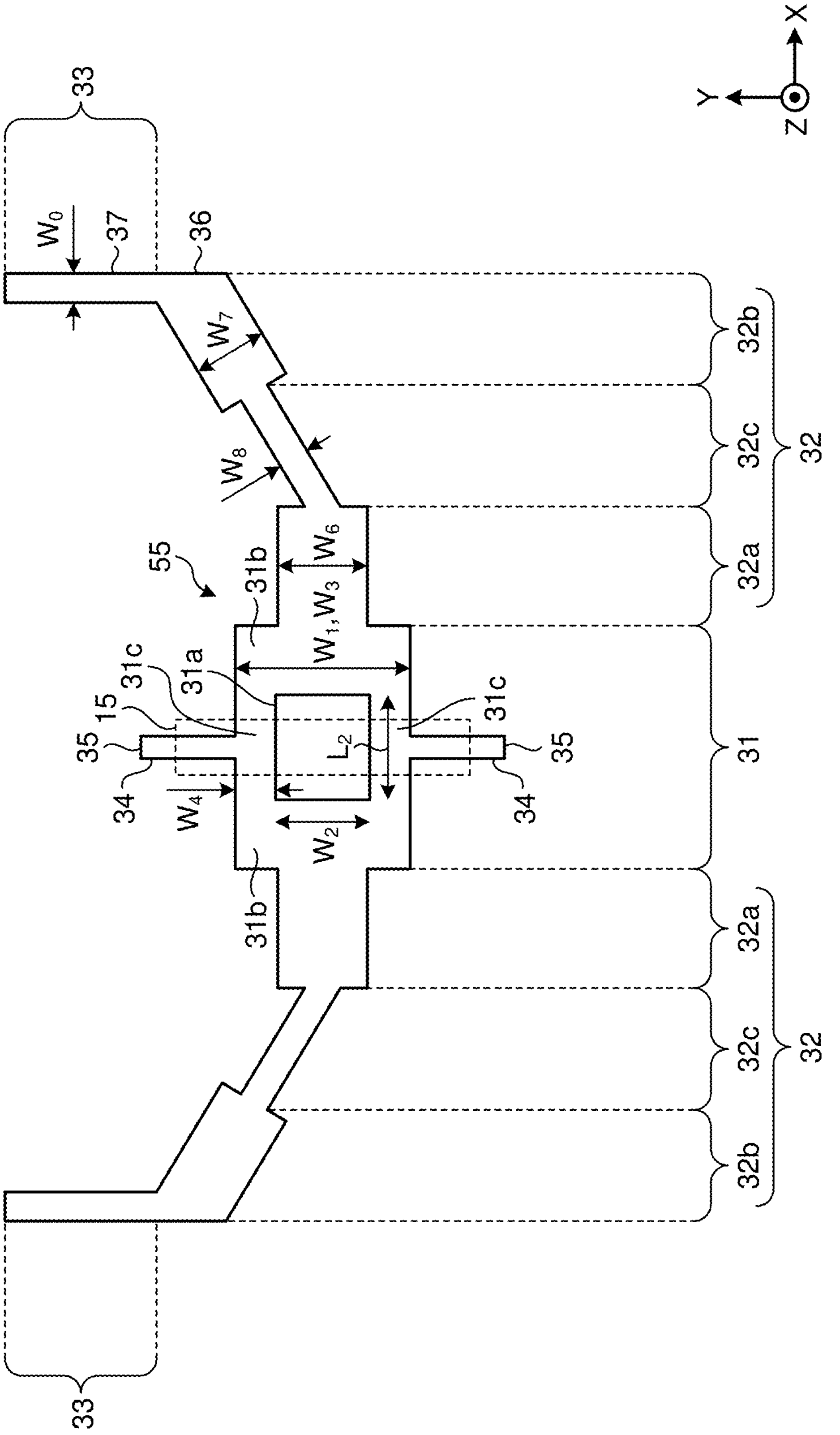
FIG. 11 is a plan view of a line conductor in a modification of the third embodiment.

Next, a modification of the waveguide-microstrip line converter 53 according to the third embodiment will be described. FIG. 11 is a plan view of a line conductor 55 in the modification of the third embodiment. In FIG. 11, the slot 15 is indicated by broken lines for reference. The line conductor 55 in the present modification is different from the line conductor 54 described above in that the extending directions of the second impedance transformation sections 32*b* and the third impedance transformation sections 32*c* are oblique directions, and stubs 34 are added.

The first impedance transformation sections 32*a* extend in the X-axis direction. The second impedance transformation sections 32*b* and the third impedance transformation sections 32*c* extend in directions oblique to the X-axis direction and the Y-axis direction. The second impedance transformation sections 32*b* and the third impedance transformation sections 32*c* are inclined toward the +side of the Y axis from the first impedance transformation sections 32*a* toward the microstrip lines 33. Thus, the line length of the microstrip lines 33 can be shortened. The loss of power due to the properties of the material of the dielectric substrate 11 and the loss of power due to the conductivity of the line conductor 55 are substantially proportional to the line length of the entire line conductor 55. Therefore, since the length of the microstrip lines 33 can be shortened, power loss due to the transmission of high-frequency signals can be reduced.

The positions of the second impedance transformation sections 32*b* and the third impedance transformation sections 32*c* may be adjusted to bring the extending directions of the second impedance transformation sections 32*b* and the third impedance transformation sections 32*c* closer to the X-axis direction or the Y-axis direction. By thus adjusting the positions of the second impedance transformation sections 32*b* and the third impedance transformation sections 32*c*, the positions of discontinuous portions of the line conductor 55 and the amplitude and phase of electromagnetic waves radiated from the discontinuous portions can be adjusted, so that unnecessary electromagnetic waves radiated from the line conductor 55 can be reduced.

The line conductor 55 includes the two stubs 34 that are branch portions branching off from the conversion section 31. The two stubs 34 are provided in the center position of the conversion section 31 in the X-axis direction. One stub 34 extends from an edge of the conversion section 31 on the +side of the Y axis toward the +side of the Y axis. The other stub 34 extends from an edge of the conversion section 31 on the −side of the Y axis toward the −side of the Y axis. An end 35 of each stub 34 facing the opposite direction to the conversion section 31 is an open end.

In FIG. 11, the center positions of the stubs 34 in the X-axis direction coincide with the center position of the slot 15 in the X-axis direction. In this case, the line conductor 55 has symmetry with respect to the center of the slot 15, so that propagation of power to the two stubs 34 does not occur. However, an error in the manufacturing of the line conductor 55 or the like can cause a misalignment between the center position of the line conductor 55 in the X-axis direction and the center position of the slot 15 in the X-axis direction, causing misalignments between the center positions of the stubs 34 in the X-axis direction and the center position of the slot 15 in the X-axis direction.

Electric fields are produced in the stubs 34 with the misalignment between the center position of the line conductor 55 and the center position of the slot 15. Since the ends 35 of the stubs 34 are open ends, boundary conditions for the electric fields to become zero at connections between the stubs 34 and the conversion section 31 are satisfied. This ensures electrical symmetry in the line conductor 55, so that the phases of high-frequency signals output from the two microstrip lines 33 become opposite to each other. The provision of the stubs 34 in this manner can reduce the effect of a misalignment between the center position of the line conductor 55 and the center position of the slot 15 on high-frequency signals. That is, by ensuring the electrical symmetry using the two stubs 34, variations in the phases of high-frequency signals in the microstrip lines 33 can be reduced. Note that only one stub 34 may be provided to the line conductor 55. When only one stub 34 is provided, the stub 34 may be provided at either the edge of the conversion section 31 on the +side of the Y axis or the edge on the −side of the Y axis.

The present modification adopts both making the extending directions of the second impedance transformation sections 32*b* and the third impedance transformation sections 32*c* oblique directions and adding the stubs 34, but may adopt only one of them. That is, the line conductor 54 of the third embodiment illustrated in FIG. 10 may have a configuration in which the extending directions of the second impedance transformation sections 32*b* and the third impedance transformation sections 32*c* are made oblique directions illustrated in FIG. 11, and the stubs 34 illustrated in FIG. 11 are not added. Alternatively, in the line conductor 54 of the third embodiment illustrated in FIG. 10, the stubs 34 illustrated in FIG. 11 may be added without changing the extending directions of the second impedance transformation sections 32*b* and the third impedance transformation sections 32*c*.

Fourth Embodiment

Figure 12:
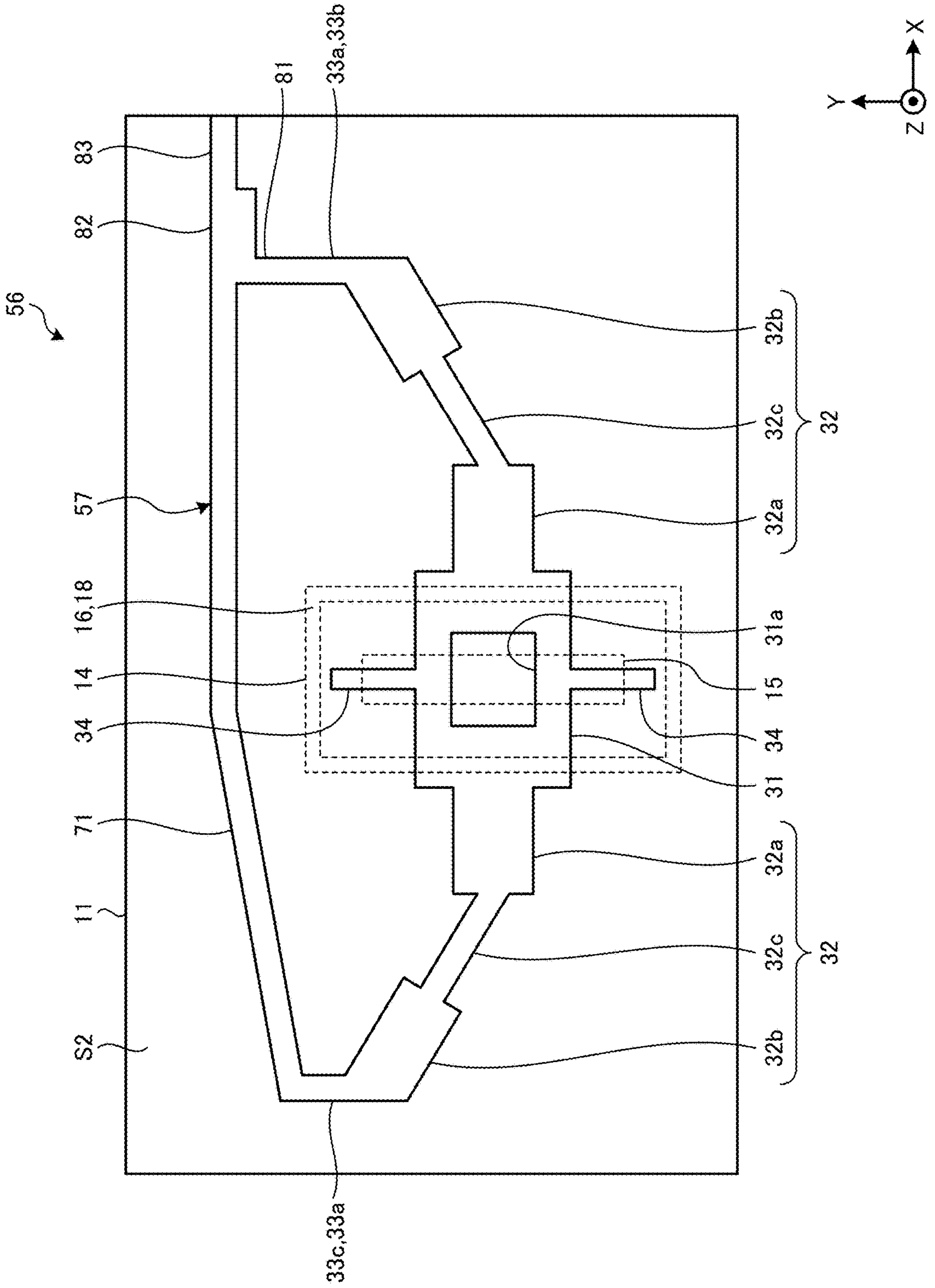
FIG. 12 is a plan view illustrating an external configuration of a waveguide-microstrip line converter according to a fourth embodiment.
Figure 13:
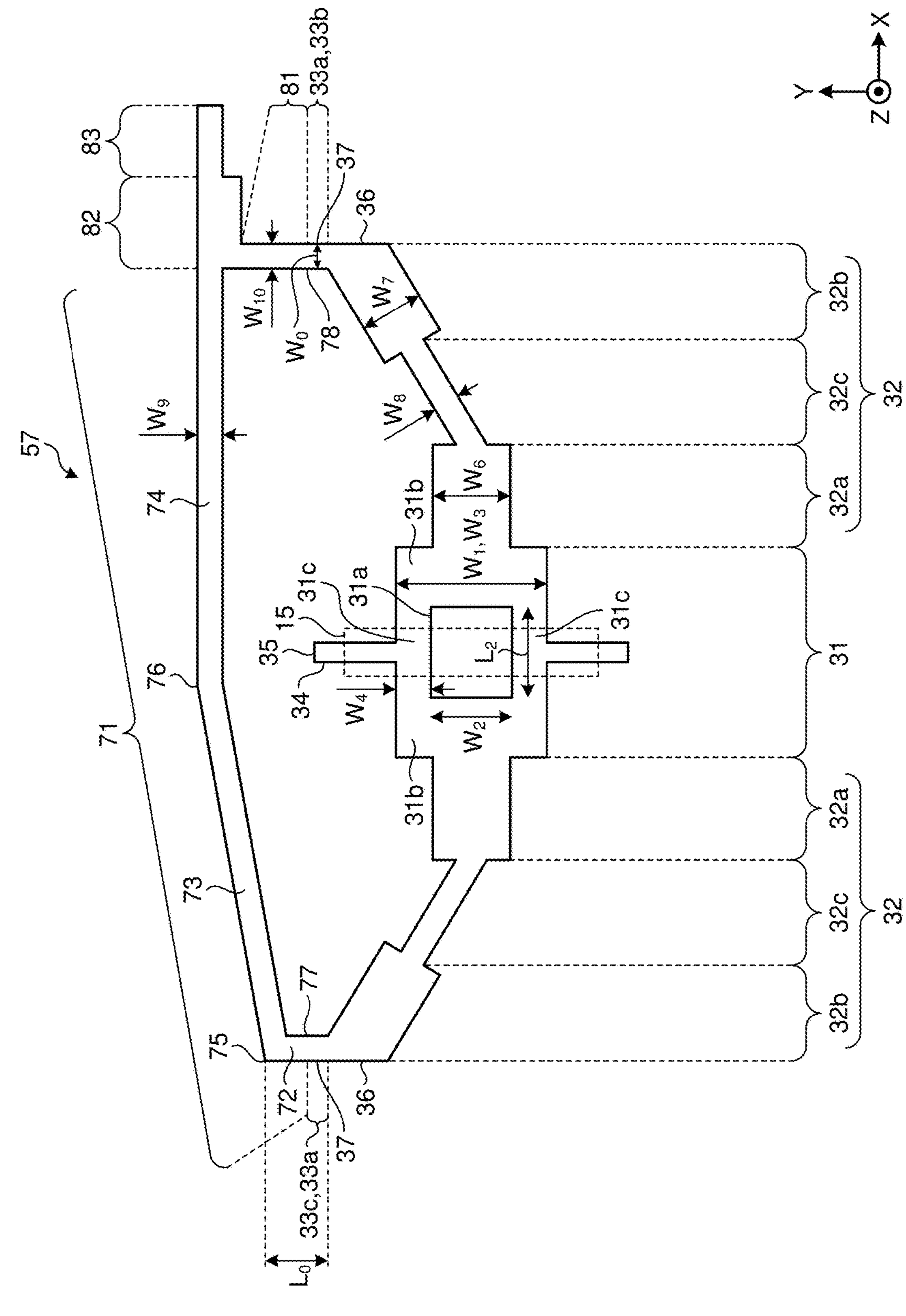
FIG. 13 is a plan view of a line conductor in the fourth embodiment.

FIG. 12 is a plan view illustrating an external configuration of a waveguide-microstrip line converter 56 according to a fourth embodiment. FIG. 13 is a plan view of a line conductor 57 in the fourth embodiment. In FIG. 13, the slot 15 is indicated by broken lines for reference. The same portions as those in the third embodiment described above are denoted by the same reference numerals without duplicate explanations. In the fourth embodiment, the line conductor 57 is provided instead of the line conductor 55 in the modification of the third embodiment. The fourth embodiment is different from the modification of the third embodiment described above in including two first microstrip lines 33*a*, a second microstrip line 71, a third microstrip line 81, a fourth microstrip line 83, and a fourth impedance transformation section 82 illustrated in FIG. 13. In the following, when the two first microstrip lines 33*a* are distinguished, one located on the +side of the X axis is referred to as a first microstrip line 33*b*, and the other located on the −side of the X axis as a first microstrip line 33*c*. The configuration of the first microstrip lines 33*b* and 33*c* is similar to the configuration of the microstrip lines 33 in the first to third embodiments described above.

As illustrated in FIG. 13, the second microstrip line 71 is connected to the first microstrip line 33*c*. The second microstrip line 71 includes: a first area 72 extending from the end of the first microstrip line 33*c* on the +side of the Y axis toward the +side of the Y axis; a second area 73 extending in an oblique direction from the end of the first area 72 on the +side of the Y axis toward the +side of the X axis so as to be located on the +side of the Y axis; and a third area 74 extending from the end of the second area 73 facing the opposite direction to the first area 72 toward the +side of the X axis.

A first bend 75 is provided between the first area 72 and the second area 73. A second bend 76 forming an obtuse angle is provided between the second area 73 and the third area 74. The line width $W_9$ of the second microstrip line 71 is equal to the line width $W_0$ of the first microstrip lines 33*a*. That is, the relationship $W_9=W_0$ holds.

The third microstrip line 81 extends from the end of the first microstrip line 33*b* on the +side of the Y axis toward the +side of the Y axis. The line width $W_{10}$ of the third microstrip line 81 is equal to the line width $W_0$ of the first microstrip lines 33*a*. That is, the relationship $W_{10}=W_0$ holds.

The fourth impedance transformation section 82 is located between the third area 74 of the second microstrip line 71 and the third microstrip line 81, and the fourth microstrip line 83. The fourth impedance transformation section 82 performs impedance matching between the second microstrip line 71 and the third microstrip line 81, and the fourth microstrip line 83. The line length of the fourth impedance transformation section 82 is a length corresponding to $\lambda/4$.

The fourth microstrip line 83 extends from the end of the fourth impedance transformation section 82 on the +side of the X axis toward the +side of the X axis. The fourth microstrip line 83 is located in an end portion of the line conductor 57 in the X-axis direction. The line width and the line length of the fourth microstrip line 83 are not particularly limited, and may be appropriately changed.

In the first to third embodiments described above, the two microstrip lines 33 act as independent input/output ends, and the number of the microstrip lines 33 acting as the input/output ends is two. On the other hand, in the fourth embodiment, the two first microstrip lines 33*b* and 33*c* are connected to the single fourth microstrip line 83 via the second microstrip line 71, the third microstrip line 81, and the fourth impedance transformation section 82. The number of the fourth microstrip line 83, acting as an input/output end, is one. Antennas (not illustrated) may be connected to the ends of the microstrip lines 33 and the fourth microstrip line 83, which act as the input/output ends. In this case, in the above-described first to third embodiments, since the number of the microstrip lines 33 acting as the input/output ends is two, two antennas are connected to each of the waveguide-microstrip line converters 10, 51, and 53. On the other hand, in the fourth embodiment, since the single fourth microstrip line 83 acts as the input/output end, one antenna is connected to the waveguide-microstrip line converter 56. Thus, the fourth embodiment is effective when one antenna is connected.

Next, the operation of the waveguide-microstrip line converter 56 will be described with reference to FIGS. 12 and 13. Here, a case where a high-frequency signal is transmitted from the waveguide 14 to the fourth microstrip line 83 will be described as an example.

An electromagnetic wave that has propagated inside the waveguide 14 illustrated in FIG. 12 propagates to each of the two first microstrip lines 33*b* and 33*c* via the conversion section 31 and others. As illustrated in FIG. 13, the phase of the high-frequency signal at the boundary 77 between the first microstrip line 33*c* and the second microstrip line 71 is opposite to the phase of the high-frequency signal at the boundary 78 between the first microstrip line 33*b* and the third microstrip line 81.

The high-frequency signal that has passed through the boundary 77 propagates to the fourth microstrip line 83 via the second microstrip line 71 and the fourth impedance transformation section 82. The high-frequency signal that has passed through the boundary 78 propagates to the fourth microstrip line 83 via the third microstrip line 81 and the fourth impedance transformation section 82. The waveguide-microstrip line converter 56 illustrated in FIG. 12 outputs the high-frequency signal transmitted from the fourth microstrip line 83 toward the +side of the X axis. In the fourth embodiment, the line length of the second microstrip line 71 is set such that the phase of the high-frequency signal that has passed through the second microstrip line 71 becomes the same as the phase of the high-frequency signal that has passed through the third microstrip line 81 in the fourth impedance transformation section 82 to which the second microstrip line 71 and the third microstrip line 81 are connected.

Here, a line length $L_0$ is the sum of the line length of the first microstrip line 33*c* and the line length of the first area 72 of the second microstrip line 71 illustrated in FIG. 13. The line length $L_0$ is preferably as short as possible. The line length $L_0$ is preferably, for example, a length of $\lambda/4$ or less, and is more preferably shorter than $\lambda/4$. The shorter the line length $L_0$ is made, the closer the first bend 75 is to the second impedance transformation section 32*b*. This brings together the bends formed between the second impedance transformation section 32*b* located on the −side of the X axis and the first microstrip line 33*c* and between the first microstrip line 33*c* and the second microstrip line 71 in a loop-shaped transmission path. As a result of bringing together the bents in the transmission path, the number of places where unnecessary electromagnetic radiation can occur can be reduced. Consequently, the line conductor 57 including the loop-shaped transmission path can reduce power loss due to unnecessary electromagnetic radiation.

The degree of the angle of the second bend 76 is smaller than the degree of the angle of the first bend 75, and thus unnecessary electromagnetic radiation due to the provision of the second bend 76 can be suppressed. Note that the second bend 76 may be omitted from the second microstrip line 71. That is, the second area 73 of the second microstrip line 71 may be extended in the X-axis direction from the first bend 75 and connected to the fourth impedance transformation section 82, or may be extended in an oblique direction from the first bend 75 to the fourth impedance transformation section 82.

The fourth embodiment can have the same effects as those of the first to third embodiments. Further, the fourth embodiment can reduce power loss due to unnecessary electromagnetic radiation in the loop-shaped transmission path by setting the line length $L_0$ to a length of $\lambda/4$ or less. This can provide stable and high electrical performance and can improve reliability.

Note that a high-frequency signal may be input from the waveguide 14 and output from the fourth microstrip line 83, or a high-frequency signal may be input from the fourth microstrip line 83 and output from the waveguide 14. Further, the fourth impedance transformation section 82 may be omitted, the second microstrip line 71 and the third microstrip line 81 may each be directly connected to the fourth microstrip line 83, and an impedance transformation section (not illustrated) may be provided in the middle of each of the second microstrip line 71 and the third microstrip line 81. Furthermore, the extending direction of each of the fourth impedance transformation section 82 and the fourth microstrip line 83 may be a direction other than the X-axis direction.

The configurations described in the above embodiments illustrate an example and can be combined with another known art. The embodiments can be combined with each other. The configurations can be partly omitted or changed without departing from the gist.

REFERENCE SIGNS LIST

10, 51, 53, 56 waveguide-microstrip line converter; 11 dielectric substrate; 12 ground conductor; 13, 52, 54, 55, 57 line conductor; 14 waveguide; 15 slot; 16 open end; 17 input/output end; 18 end face; 19 tube wall; 31 conversion section; 31*a* hole; 31*b* wide portion; 31*c* narrow portion; 32 impedance transformer; 32*a* first impedance transformation section; 32*b* second impedance transformation section; 32*c* third impedance transformation section; 33 microstrip line; 33*a*, 33*b*, 33*c* first microstrip line; 34 stub; 35, 36, 37 end or edge; 71 second microstrip line; 72 first area; 73 second area; 74 third area; 75 first bend; 76 second bend; 77, 78 boundary; 81 third microstrip line; 82 fourth impedance transformation section; 83 fourth microstrip line; S1 first surface; S2 second surface.

The invention claimed is:

1. A waveguide-microstrip line converter comprising:

a waveguide having an open end;

a dielectric substrate having a first surface facing the open end and a second surface facing an opposite direction to the first surface;

a ground conductor provided on the first surface and connected to the open end, the ground conductor being provided with a slot in a region enclosed by an end face of the open end; and a line conductor provided on the second surface, the line conductor including, a conversion section adapted to perform power conversion between the line conductor and the waveguide;

a microstrip line provided at a distance from the conversion section in a first direction; and an impedance transformer provided between the conversion section and the microstrip line, adapted to perform impedance matching between the conversion section and the microstrip line, wherein a hole is formed in the conversion section.

2. The waveguide-microstrip line converter according to claim 1, wherein the microstrip line extends from the impedance transformer in a second direction perpendicular to the first direction, and the impedance transformer and the microstrip line are arranged such that an edge of the microstrip line intersected by the first direction and an edge of the impedance transformer intersected by the first direction form one straight line along the second direction.

3. The waveguide-microstrip line converter according to claim 1, wherein the impedance transformer includes:

a first impedance transformation section;

a second impedance transformation section provided at a distance from the first impedance transformation section; and a third impedance transformation section provided between the first impedance transformation section and the second impedance transformation section, the third impedance transformation section having a line width smaller than both a line width of the first impedance transformation section and a line width of the second impedance transformation section.

4. The waveguide-microstrip line converter according to claim 3, wherein the first impedance transformation section extends in the first direction, and the second impedance transformation section and the third impedance transformation section extend in a direction oblique to the first direction.

5. The waveguide-microstrip line converter according to claim 3, wherein the microstrip line extends from the impedance transformer in a second direction perpendicular to the first direction, and the impedance transformer and the microstrip line are arranged such that an edge of the microstrip line intersected by the first direction and an edge of the impedance transformer intersected by the first direction form one straight line along the second direction.

6. The waveguide-microstrip line converter according to claim 1, wherein the line conductor further includes at least one stub branching off from the impedance transformer in a second direction perpendicular to the first direction.

7. The waveguide-microstrip line converter according to claim 1, wherein the hole in the conversion section has a length in the first direction less than half a wavelength of a high-frequency signal transmitted through the line conductor and a width in a second direction perpendicular to the first direction less than a line width of the conversion section.

8. The waveguide-microstrip line converter according to claim 1, wherein the line conductor includes:

two first microstrip lines extending from the impedance transformer, a second microstrip line connected to one of the first microstrip lines, a third microstrip line connected to the other of the first microstrip lines, and a fourth microstrip line connected to the second and third microstrip lines via a fourth impedance transformation section, the fourth microstrip line is adapted to act as a single input/output end.

9. The waveguide-microstrip line converter according to claim 1, wherein the conversion section has a line width $W_1$, the microstrip line has a line width $W_0$, the impedance transformer has a line width $W_5$, and relationships $W_1>W_5$ and $W_5>W_0$ are satisfied.

10. The waveguide-microstrip line converter according to claim 9, wherein the impedance transformer includes a first impedance transformation section having a line width $W_6$, a second impedance transformation section having a line width $W_7$, and a third impedance transformation section having a line width $W_8$, and relationships $W_8<W_6$, $W_7>W_8$, and $W_7>W_0$ are satisfied.

11. The waveguide-microstrip line converter according to claim 10, wherein the microstrip line extends from the second impedance transformation section in a second direction perpendicular to the first direction, and the line width $W_7$ of the second impedance transformation section is greater than the line width $W_0$ of the microstrip line in the second direction.

12. The waveguide-microstrip line converter according to claim 11, wherein the line conductor further includes:

two first microstrip lines each having the line width $W_0$, a second microstrip line having a line width $W_9$ equal to $W_0$, a third microstrip line having a line width $W_{10}$ equal to $W_0$, and a fourth microstrip line connected to the second microstrip line and the third microstrip line via a fourth impedance transformation section.

13. The waveguide-microstrip line converter according to claim 9, wherein the conversion section includes two narrow portions each having a line width $W_4$, the hole has a width $W_2$ in a second direction perpendicular to the first direction, and a relationship $W_4=(W_1-W_2)/2$ is satisfied.

14. The waveguide-microstrip line converter according to claim 13, wherein the two narrow portions are provided on opposite sides of the hole, and the line width $W_4$ of each narrow portion is less than the line width $W_1$ of the conversion section.

* * * * *